(12) United States Patent
Alsheuski

(10) Patent No.: US 12,501,141 B2
(45) Date of Patent: Dec. 16, 2025

(54) CONTROLLING AN IMAGING DEVICE OPERATIONAL STATE

(71) Applicant: JSC Yukon Advanced Optics Worldwide, Vilneus (LI)

(72) Inventor: Aliaksandr Alsheuski, Vilnius (LI)

(73) Assignee: JSC Yukon Advanced Optics Worldwide (LT)

( * ) Notice: Subject to any disclaimer, the term of this patent is extended or adjusted under 35 U.S.C. 154(b) by 0 days.

(21) Appl. No.: 18/541,014

(22) Filed: Dec. 15, 2023

(65) Prior Publication Data

US 2024/0129614 A1 Apr. 18, 2024

Related U.S. Application Data

(63) Continuation of application No. 17/686,070, filed on Mar. 3, 2022, now Pat. No. 11,985,410.

(51) Int. Cl.
*H04N 23/61* (2023.01)
*H04N 23/63* (2023.01)
*H04N 23/65* (2023.01)

(52) U.S. Cl.
CPC .......... *H04N 23/61* (2023.01); *H04N 23/633* (2023.01); *H04N 23/65* (2023.01)

(58) Field of Classification Search
CPC ...... H04N 23/61; H04N 23/633; H04N 23/65; H04N 23/634; H04N 23/635; H04N 23/63
See application file for complete search history.

(56) References Cited

U.S. PATENT DOCUMENTS

| 10,444,005 | B1 * | 10/2019 | Dryer | G06F 3/0488 |
| 2005/0018879 | A1 * | 1/2005 | Ito | H04N 7/183 |
| | | | | 348/E7.087 |
| 2011/0043658 | A1 * | 2/2011 | Sasai | H04N 9/8205 |
| | | | | 348/231.3 |
| 2012/0046100 | A1 | 2/2012 | Roman et al. | |
| 2016/0169625 | A1 | 6/2016 | Richards | |
| 2017/0193279 | A1 * | 7/2017 | Kusens | G16H 10/60 |

(Continued)

FOREIGN PATENT DOCUMENTS

JP 2003-087643 3/2003

OTHER PUBLICATIONS

Feng et al., "Infrared Image Recognition Technology Based on Visual Processing and Deep Learning," 2020 Chinese Automation Congress (CAC), Nov. 6-8, 2020, pp. 641-645.

(Continued)

*Primary Examiner* — Tat C Chio
(74) *Attorney, Agent, or Firm* — Fish & Richardson P.C.

(57) ABSTRACT

An imaging device can stop displaying a reticle or other information when the imaging device determines that it is being used in a prohibited way. The imaging device can include an image capture device configured to view an image of a scene that includes an object viewed by the imaging device; a display to display an image of a reticle and the image of the scene; a hardware processor; and a memory storing computer-readable instructions, the instructions executable by the hardware processor to perform operations. The operations can include performing image recognition analysis on the image of the scene; determining that the object in the image is a prohibited object; and causing the display to cease displaying the image of the reticle.

22 Claims, 11 Drawing Sheets

(56) References Cited

U.S. PATENT DOCUMENTS

2019/0297232 A1    9/2019  Alsheuski
2020/0084355 A1*   3/2020  Ishii ........................ G06T 7/50
2022/0159934 A1*   5/2022  Molloy ................ A01K 29/005

OTHER PUBLICATIONS

International Search Report and Written Opinion in International Appln. No. PCT/EP2023/055049, dated May 4, 2023, 13 pages.
Ippalapally et al., "Object Detection Using Thermal Imaging," 2020 IEEE 17th India Council International Conference (INDICON), Dec. 10-13, 2020, pp. 1-6.

* cited by examiner

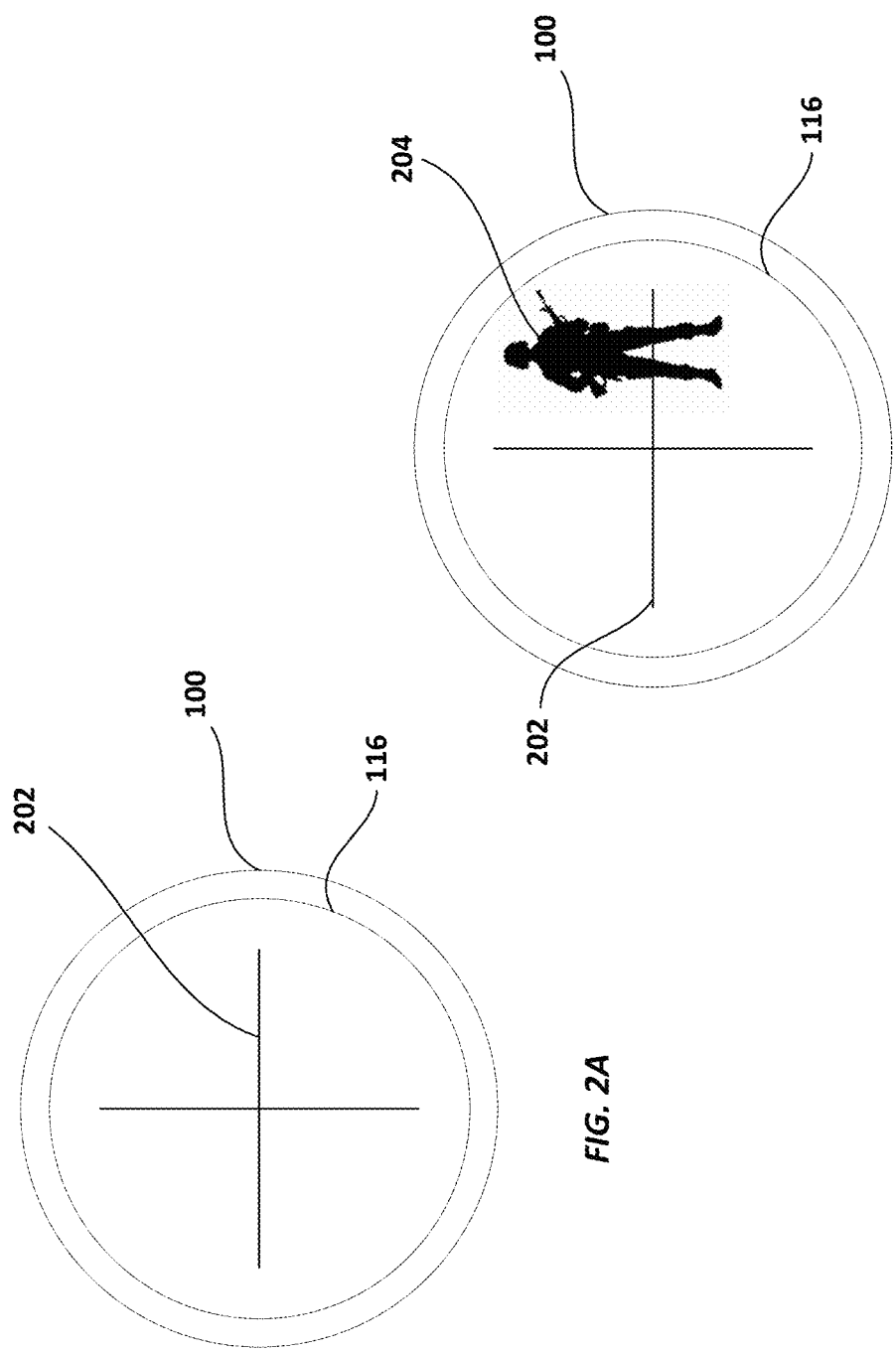

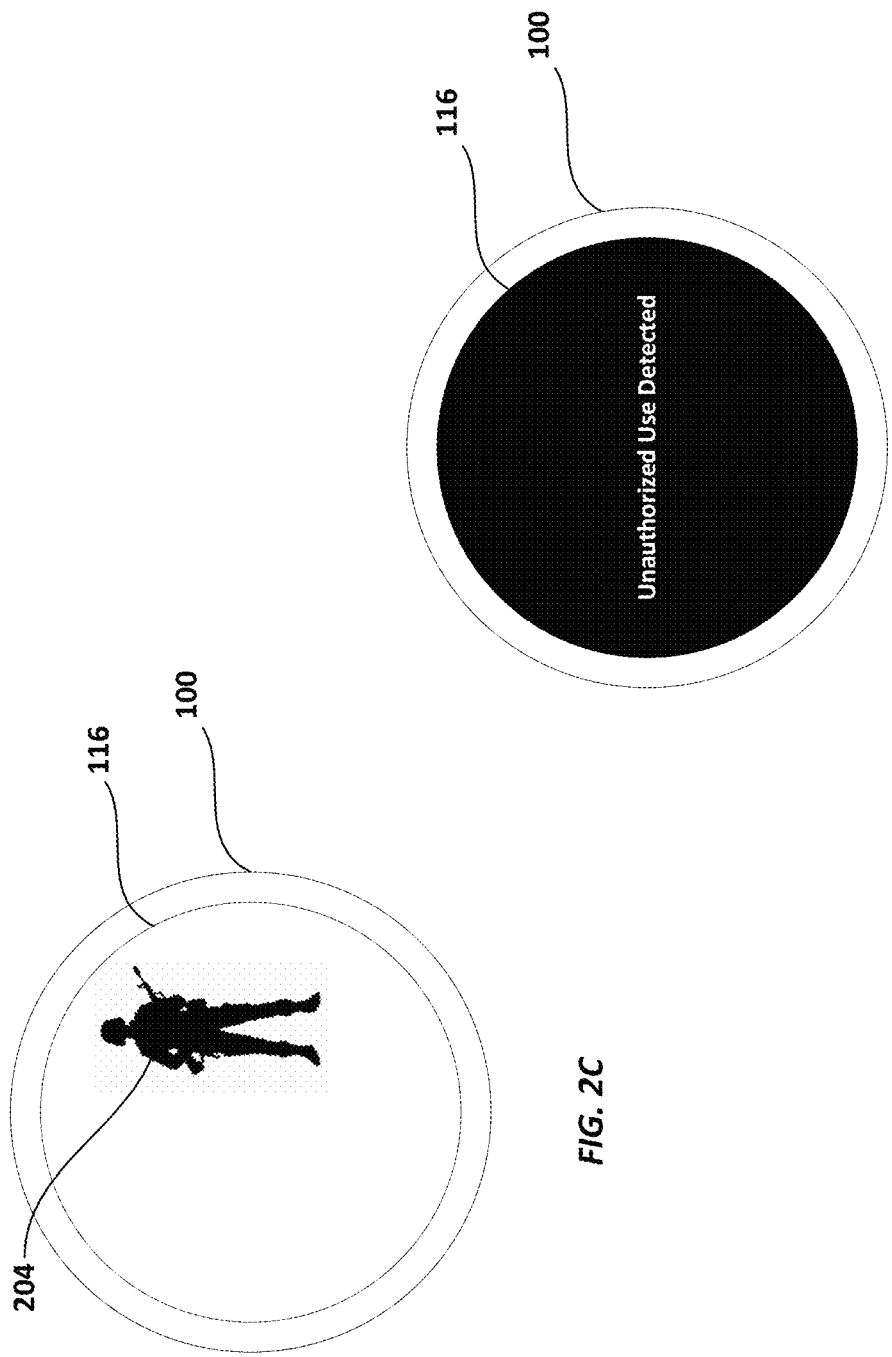

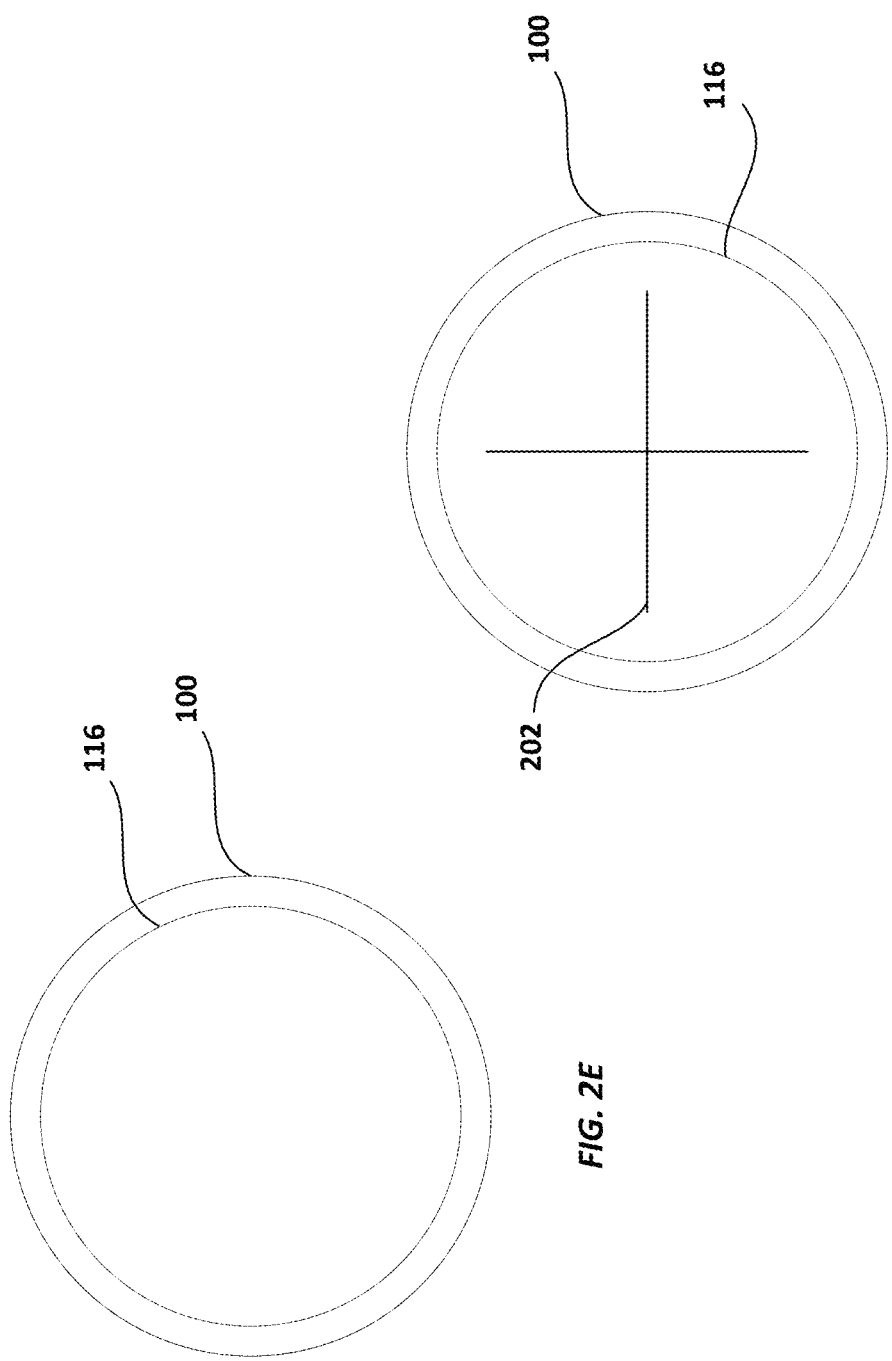

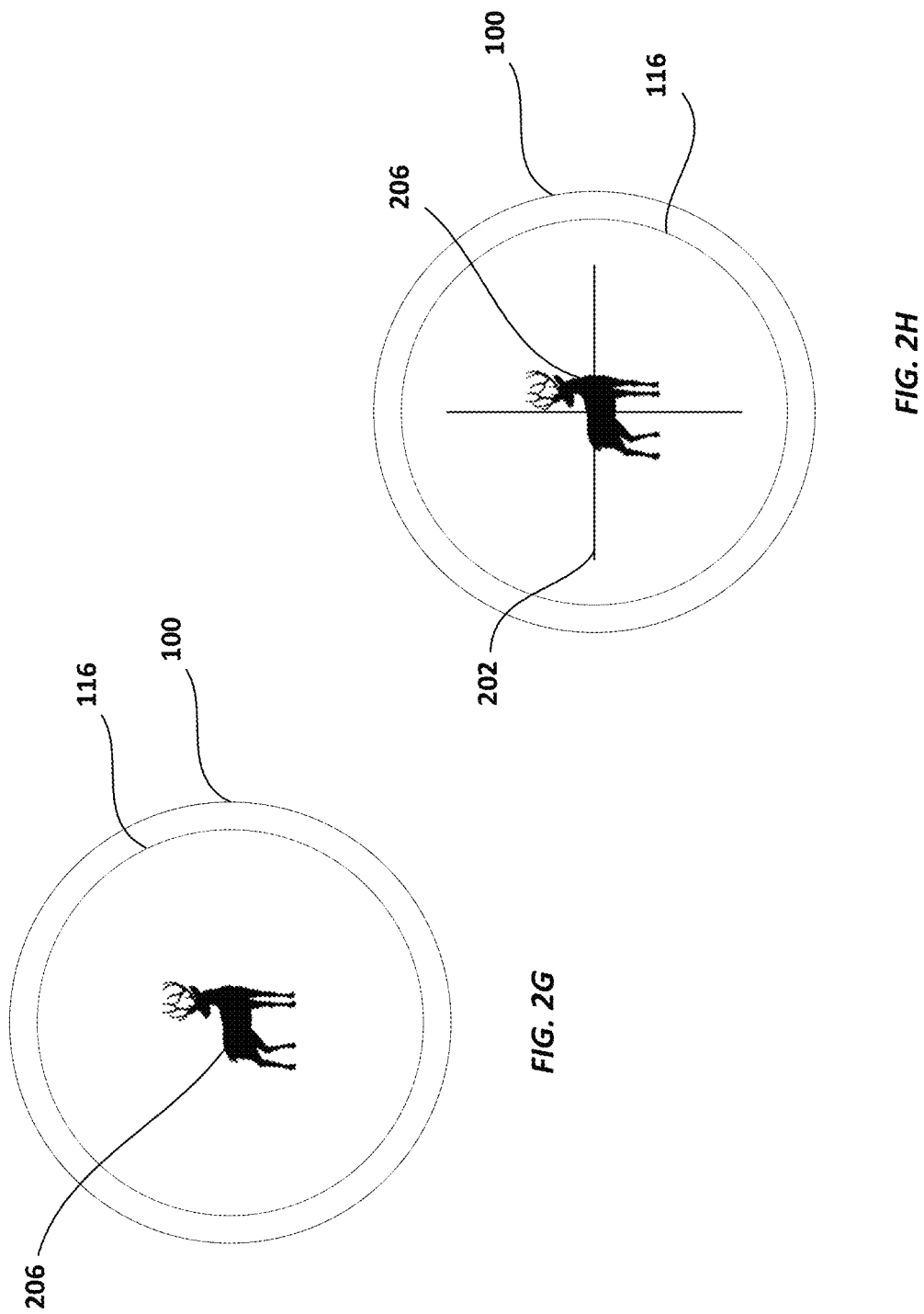

CONTROLLING AN IMAGING DEVICE OPERATIONAL STATE

CROSS-REFERENCE TO RELATED APPLICATIONS

This application claims priority to U.S. application Ser. No. 17/686,070 which was filed Mar. 3, 2022 and is considered part of the disclosure of this application, and is incorporated by reference in its entirety into this application.

BACKGROUND

Certain types of goods and technology are subject to import and export control regulations. For example, the import and export of certain optical devices are regulated by various agencies. The regulation of optical devices for import and export control is based on how the device is classified. For example, military-grade night vision devices require a license from the United States Department of State. Non-compliance with import and export control regulations can be meet with significant penalties.

SUMMARY

Aspects of the present disclosure include an imaging device that includes an image capture device configured to view an image of a scene that includes an object viewed by the imaging device; a display to display an image of a reticle and the image of the scene; a hardware processor; and a memory storing computer-readable instructions, the instructions executable by the hardware processor to perform operations. The operations can include performing image recognition analysis on the image of the scene; determining that the object in the image is a prohibited object; and causing the display to cease displaying the image of the reticle.

Aspects of the embodiments include a method that includes displaying a reticle on a display of an imaging device; viewing, by the imaging device, an object within a field of view of the imaging device; determining, by an image processor, that the object is a prohibited object; and ceasing to display the reticle on the display of the imaging device.

Aspects of the embodiments include anon-transitory, computer-readable medium storing instructions, the instructions executable by a hardware processor to perform operations including display a reticle on a display of an imaging device; receive signals representing an object in a scene; create an imaging of the object in the scene from the received signals; performing image recognition analysis on the image of objects in a scene; determining that the object in the image is a prohibited object; and causing the display to cease displaying the image of the reticle.

In some embodiments, a memory including an object list, and determining that the object in the image is a prohibited object includes comparing the object to the object list.

Some embodiments can include determining that the prohibited object is in a field of view of the imaging device; and causing the imaging device to turn off if the prohibited object is in the field of view after an expiration of a threshold amount of time.

Some embodiments can include incrementing a counter indicating a counter value of times a prohibited object has been identified; comparing the counter value to a threshold value; and turning the imaging device off if the counter value exceeds the threshold.

Some embodiments can include determining that the prohibited object is in a field of view of the imaging device; and causing the display to turn off if the prohibited object is in the field of view after an expiration of a threshold amount of timer.

Some embodiments can include performing image recognition analysis on an image of a scene; determining that the object is no longer in the image; and causing the reticle to be displayed on the display.

In some embodiments, the image capture device includes a thermal imaging camera or a night-vision camera.

In some embodiments, the imaging device includes at least one of a thermal imaging device and a night-vision device.

BRIEF DESCRIPTION OF THE DRAWINGS

FIGS. 2A-H are schematic diagrams illustrating controlling reticle display state based on object detection in accordance with embodiments of the present disclosure.

DETAILED DESCRIPTION

This disclosure describes an optical device, such as a thermal imaging device or night-vision imaging device, that can turn off one or more critical features if the optical device is being used in a way that is out of compliance with import and export control laws or is being used in an illegal jurisdiction. For example, if an optical device determines that an object being viewed is a human, a vehicle, or other prohibited object, the optical device can turn off an reticle. If, after the reticle is turned off, the prohibited object is still being viewed, the optical device can turn off the display screen, the infrared light emitter(s), image processors, and/or the optical device entirely.

In some embodiments, the optical device can include a global positioning system (GPS) or other type of positioning system. The optical device can determine its location, and based on the location of the optical device, shut down one or more critical systems. For example, if the optical device is in a country that is subject to trade sanctions or a country where such optical devices are illegal, the optical device can shut of the reticle, the processors, the display screen, the infrared emitters, and/or the optical device in its entirety.

Figure 1:
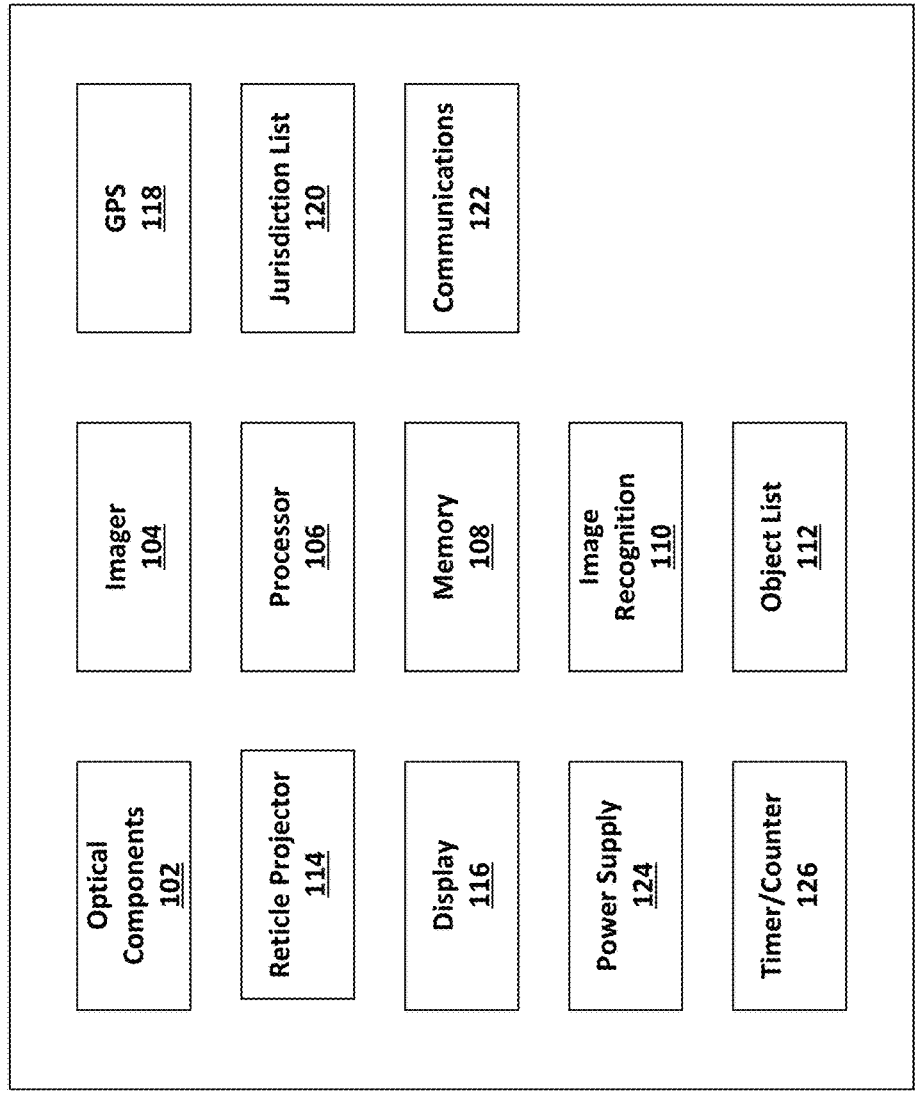
FIG. 1 is a schematic block diagram of an example optical device in accordance with embodiments of the present disclosure.

FIG. 1 is a schematic block diagram of an example imaging device 100 in accordance with embodiments of the present disclosure. The imaging device 100 can be any type of imaging device that includes a projected or displayed reticle. Such an imaging device 100 includes a thermal imaging rifle scope, thermal imaging binoculars, thermal imaging spotting scope, night-vision rifle scope, night-vision binoculars, night-vision spotting scope, optical scope, red dot sight, holographic sight, or other type of imaging device.

Imaging device 100 can create and present (e.g., display) an image of a scene in real-time. Imaging device 100 can include optical components 102, such as forward or objective lenses, focusing lenses, ocular lenses, an optical path, prisms, mirrors, etc. The optical components 102 can be used to receive light or thermal radiation or other electromagnetic (EM) signals (referred to collectively as EM signals) from objects that make up a scene. The optical components 102 can be used to focus the incoming EM signals and direct the EM signals within the optical path. More details on the optical components 102 are provided in FIGS. 6A-B below.

The imaging device 100 can include an imager 104. Imager 104 can include a thermal imaging device, such as a thermal camera, thermal sensor, infrared sensor, charge coupled device (CCD), or other type of imager. Imager 104 can convert received EM signals into electrical signals for processing. For example, electrical signals representing objects from a scene can be sent from the imager 104 to processor 106. Processor 106 can be a hardware processor that can execute instructions stored in memory 108. Processor 106 can be a computer, such as that described in FIG. 7. Processor 106 can perform imaging processing on received electrical signals from imager 104 to render the electrical signals into a format for display on display 116.

The display 116 can include a liquid crystal display (LCD), light emitting diode (LED) display, or other type of display. Display 116 can provide a visual representation of the objects in the scene to an operator. In embodiments, display 116 can present a reticle or other aiming structure overlaid onto the displayed image (the term "reticle" will be used to include any type of aiming structure). The reticle can be used for aiming, target acquisition, windage and elevation determination, and other uses. A reticle can be a crosshair, a circle or concentric circles, triangles, series of lines or dots, squares, or other geometric structures.

In some embodiments, a reticle projection module can physically project a reticle into the optical path of the imaging device. For example, a reticle projector 114 can project a reticle onto a mirror that reflects an image of the reticle into the image path.

In embodiments, the display 116 can also display information to an operator. For example, the display 116 can display distance information, magnification information, semantic information, object recognition information, imaging device modes (white hot vs dark hot), windage and elevation information, battery levels, object tracking information, or other information.

In some embodiments, the processor 106 can perform image recognition and image recognition analysis on the electrical signals. Image recognition software 110 can be stored in memory 108 and executed by the processor 106. Image recognition software 110 can use one or more image recognition techniques to identify the objects in the scene. For example, image recognition software 110 can determine that one of the objects in the scene is a prohibited object, such as a person, vehicle, window or window frame, or other prohibited object. A prohibited object is any object that indicates that the imaging device 100 is being used in a non-recreational or non-sporting way, such as for law enforcement or military applications. In some embodiments, an object list 112 can be stored in memory 108. Object list 112 can include a list of prohibited objects. The object list 112 can be part of the image recognition software 110.

Image recognition includes functionality to identify objects, places, people, writing, and/or actions in images. Processor 106 can use image recognition (also known as machine vision) technologies in combination with imager 104 and software to achieve image recognition. Image recognition software 110 can make use of artificial intelligence, machine learning, or other intelligence models. Image recognition functionality can include shape recognition, pattern recognition, and/or object detection techniques. For example, if the imaging device 100 includes a thermal imaging device or night-vision imaging device, object detection techniques can be used to recognize and classify shapes of objects.

For example, machine learning algorithm can be used for shape recognition and for determining that the shape recognized has a likelihood of being an impermissible (or prohibited) object. The compliance state of the imaging device can then be changed based on the likelihood that the imaging device is being used in a non-compliant manner.

To enforce compliance with import and export control regulations, the imaging device 100 can turn off one or more displayed features in response to detecting that a prohibited object is being viewed. For example, the imaging device 100 can determine that a person is being viewed by the operator. A person can be a prohibited object. If the imaging device 100 determines that a person is being viewed by the operator, the imaging device 100 can turn of the reticle, other displayed information, the display itself, and/or the entire imaging device 100. In this way, the imaging device 100 cannot be used for military or law enforcement applications.

In some embodiments, the compliance state can be dynamic (compliance state referring to a state when one or more features of the imaging device are off to comply with regulations). There are scenarios where a prohibited object is viewed by mistake or coincidentally when using the device for an allowed purpose. An old car might be abandoned in an area used for hunting, for example. If the imaging device 100 recognizes a car, the imaging device can trigger a compliance state until the imaging device determines that the car is no longer in view. After the imaging device 100 determines that the car is no longer in view, the imaging device 100 can switch to a normal operating state. This way, the compliance state is dynamic. The normal operating state is an operating state of the imaging device 100 where all of the device features are available to the operator.

For example, the imaging device 100 can stop displaying the reticle until the imaging device 100 determines that car is no longer in view of the imaging device 100. Once the imaging device 100 determines that the car is no longer in view of the imaging device 100, the imaging device 100 can display the reticle again.

The imaging device 100 can use a timer or counter or other mechanism 126 to ensure that the operator does not try to get around the compliance state by moving off the prohibited object and moving back onto it after the normal operating mode is reengaged. The imaging device 100 can also ensure that the operator does not ignore the compliance state by continuing to view the prohibited object when the compliance state is triggered. For example, if after the reticle is turned off, the imaging device 100 still detects a car and a certain amount of time has elapsed (e.g., 30 seconds), the imaging device 100 can turn off features so that the imaging device 100 becomes unusable, including, turning off the display and/or the entire device.

The timer/counter 126 can be used to track an amount of time between a first appearance of a prohibited object and another appearance of the same object or an appearance of another prohibited object. A predetermined threshold amount of time can be set, so that upon the expiration of the threshold, the imaging device 100 can turn itself off. For example, after the reticle is turned off, a timer can start. If the imaging device 100 determines that the prohibited object remains in view for, e.g., 30 seconds after the reticle is turned off, the display is turned off or the imaging device 100 is turned off, etc.

The timer/counter 126 can track the number of image frames instead of (or in addition to) elapsed time. After a certain number of frames of images is received that include the prohibited object, the imaging device 100 can turn itself off.

The timer/counter 126 can also track the number of occurrences of a prohibited object. After the imaging device 100 determines that the prohibited object has been detected 5 times, for example, the imaging device 100 can turn itself off.

Other ways to trigger a compliance state for the imaging device 100 are within the scope of the disclosure. Generally, if the imaging device 100 determines that it is being used in a non-compliant way, the imaging device 100 can trigger a compliance state of operation.

In some embodiments, the imaging device 100 can include a global positioning system (GPS) module 118. GPS module 118 can be used to identify a location of the imaging device 100 periodically or when requested by a third party. If the imaging device 100 is being used in jurisdiction that is illegal or otherwise out of compliance for that device, the imaging device 100 can trigger the compliance state. For example, if the imaging device 100 is being used in a country that is subject to sanctions by the exporting country, the imaging device can use the GPS 118 to determine its location and activate a compliance state if it is in an illicit jurisdiction. A jurisdiction list 120 can be stored in memory 108. The jurisdiction list 120 can be updated prior to exportation and/or periodically, as the geopolitical landscape evolves over time.

In some embodiments, the imaging device 100 can include a communications module 122 that can send a message to a server or controller or other location indicating that the imaging device 100 is being used in an illegal jurisdiction and the GPS position of the imaging device 100. The information can be used by authorities to track illegal sales and shipment of equipment.

Power Supply 124 can be used to power one or more components of the imaging device 100. Power supply 124 can be a battery or other type of power supply, as described in more detail below. Power supply 124 can be responsive to the compliance state to turn off power to the imaging device 100 if the imaging device 100 is used in a non-compliant manner.

FIGS. 2A-H are schematic diagrams illustrating controlling reticle display state based on object detection in accordance with embodiments of the present disclosure. In FIG. 2A, an imaging device 100 includes a display 116. The display 116 is displaying a reticle 202. In FIG. 2B, the imaging device 100 determines that an object being viewed is a person 204. The imaging device 100 can determine that a person 204 is a prohibited object and trigger a compliance state. In FIG. 2C, the compliance state is the reticle being turned off. (FIG. 2C shows the display 116 still displaying the person 204 but the reticle 202 is no longer displayed.) If the imaging device 100 determines that the person 204 is still being viewed after a predetermined amount of time (for example), the display 116 can blank out or turn off. This is shown in FIG. 2D. Optionally, also shown in FIG. 2D, the screen can display a message to the operator, such as "Unauthorized Use Detected."

After the engagement of any compliance state, the imaging device 100 can log the incident. After a predetermined number of incidents of illegal or unauthorized uses of the imaging device 100, the imaging device 100 can take action. For example, the imaging device 100 can permanently disengage the reticle 202. The imaging device 100 can use communications module 122 to send a message to a third party about the unauthorized use. The imaging device 100 can self-destruct. Other actions can be taken depending on the number of infractions and the severity of the infractions.

FIG. 2E shows the imaging device 100 after the reticle is switched off and the imaging device 100 has determined that the prohibited object is no longer being viewed. FIG. 2F shows that the imaging device 100 can return to a normal operating state when the imaging device 100 determines that the prohibited object is no longer being viewed. FIG. 2G also shows the imaging device 100 after the reticle is switched off and the imaging device 100 has determined that the prohibited object is no longer being viewed. In this embodiment, the imaging device 100 keeps the reticle 202 off until the imaging device 100 determines that a permitted object is in view. In FIG. 2H, the imaging device 100 determines that an animal 206 is being viewed, and the imaging device 100 turns reticle 202 back on.

The triggering of a compliance state can be used in other applications besides compliance with import and export control regulations. For example, compliance state can be activated as a standard safety precaution to alert an operator that an a person or other prohibited object is being viewed. The display 116 can turn off the reticle 202 or augment the display with colors, alerts, shapes, or other indicators to alert the operators that a prohibited object is being viewed. Other compliance states can also be triggered for safety reasons, as described above, such as shutting off the display 116 or turning off the entire device.

Figure 3:
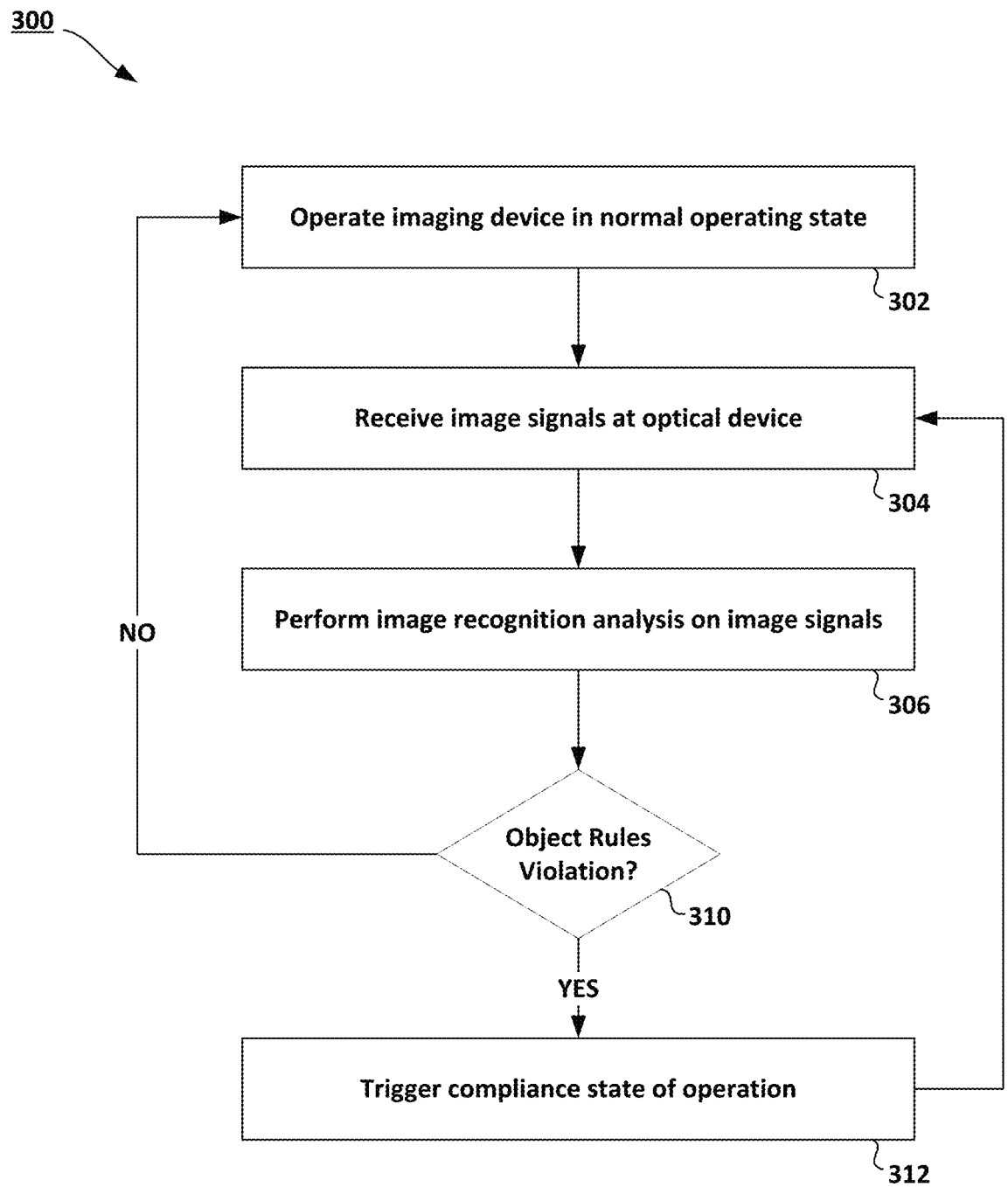
FIG. 3 is a process flow diagram for controlling reticle display state based on object detection in accordance with embodiments of the present disclosure.

FIG. 3 is a process flow diagram 300 for controlling reticle display state based on object detection in accordance with embodiments of the present disclosure. At the outset, an imaging device, such as imaging device 100, can be operating in a normal operating state. (302) The normal operating state is one where all of the functionalities of the imaging device are available to the operator. The imaging device can receive image signals. (304). For example, the imaging device can receive light or thermal radiation and convert the light or thermal radiation into an electrical signal representative of objects being viewed. The imaging device can render an image of the objects being viewed on a display in real-time. The imaging device can perform image recognition on the image of the objects. (306) If none of the objects violate an operational rule (310), the process continues to take in image data and process the image data, continuously monitoring for prohibited objects. (returns to 302)

If the imaging device determines that an object being viewed is a prohibited object, the imaging device can trigger a compliance mode of operation. (312) The compliance mode of operation can include one or more of removing a reticle from display, removing other information from display, turning off the display, turning off the imager, turning off the IR or light emission source, and/or turning off the device entirely.

The imaging device continues to monitor the received signals when in compliance state of operation. (304) The process continues from there to either maintain the compliance state of the prohibited object remains in view or return to a normal operating state if the prohibited object is no longer in view.

Figure 4:
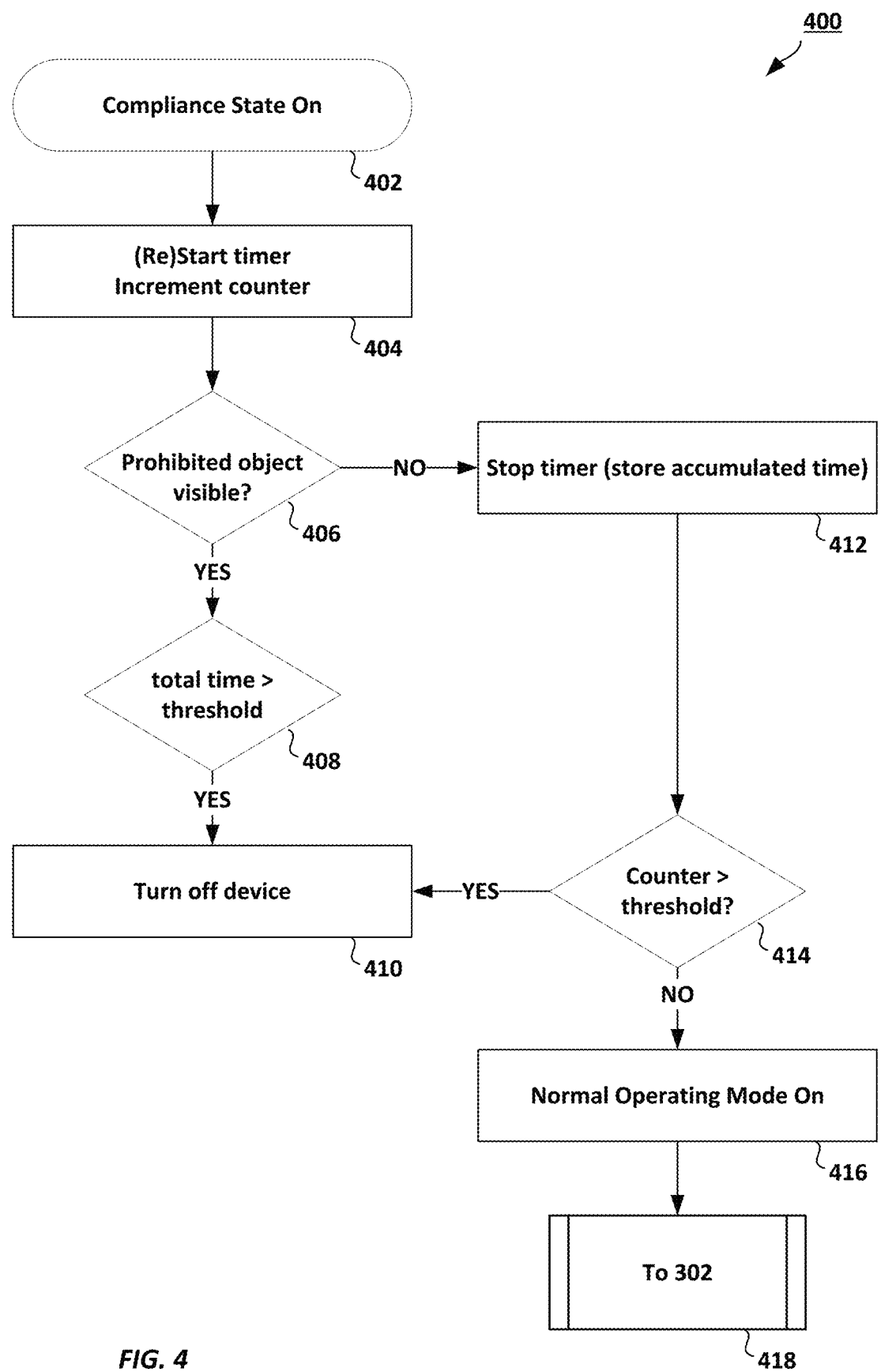
FIG. 4 is a process flow diagram for controlling optical device power state based on object detection for an elapsed period in accordance with embodiments of the present disclosure.

FIG. 4 is a process flow diagram 400 for controlling optical device power state based on object detection for an elapsed period in accordance with embodiments of the present disclosure. As an extension of the process flow 300, the imaging device can use a timer or counter to take further action if unauthorized use of the imaging device continues after the compliance state is triggered. At the outset, the compliance state is active (where one or more functionalities of the imaging device is switched off). (402) A timer is started at the first instance of the imaging device detecting a prohibited object. (404) In some embodiments, a counter can be incremented as well. The counter can track the number of incidents a prohibited object is detected. If the prohibited object continues to be visible after the timer has started (406), a total elapsed time can be compared against the time threshold. (408) For example, if the prohibited object has been detected for a total of 30 seconds, then the imaging device turns itself off (for a time threshold of 29 second, e.g.). (410). The 30 seconds can be in one event or over more than one event. For example, an operator can view a prohibited object for 15 seconds, move off of it, then return for another 15 seconds. The cumulative amount of time is 30 seconds, which would be sufficient, in this example, to trigger a shut down.

If, after the timer has started, the prohibited object disappears from view (406), the timer can stop. (412) The accumulated time can be stored in memory, and added to later with more accumulated time if the same or different prohibited object is detected.

In embodiments, the counter value can be compared against a threshold number. (414) If the counter value exceeds the predetermined threshold, then the imaging device can shut itself off. For example, the a prohibited object has been detected 51 times since the device has been turned on, and the counter threshold is 50, then the imaging device will shut itself off. If the counter value does not exceed the threshold value, then the imaging device can return to the normal operational state. (416) The process returns to step 302 in process 300 of FIG. 3. (418)

Figure 5:
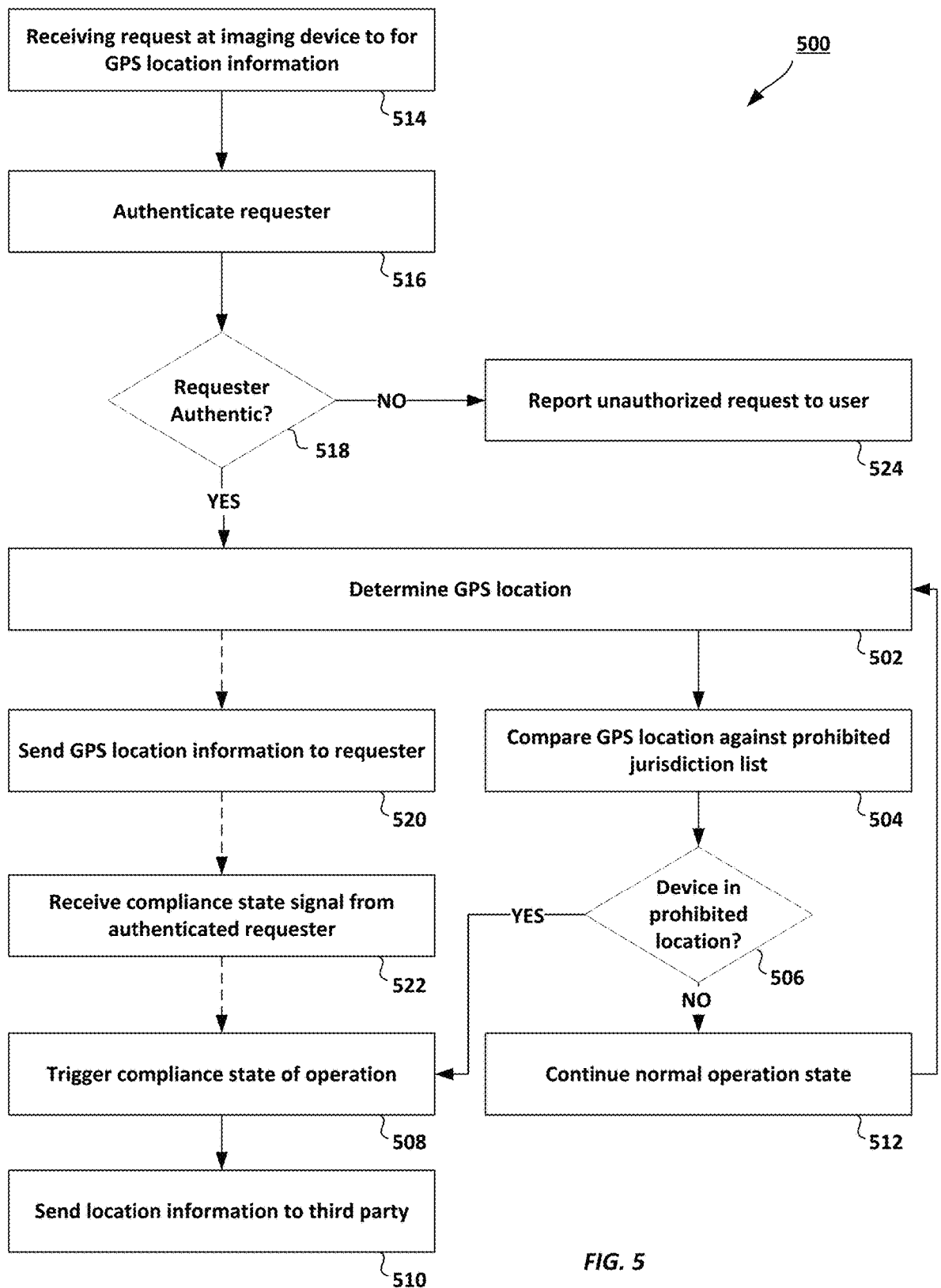
FIG. 5 is a process flow diagram for controlling reticle display state based on global positioning system location in accordance with embodiments of the present disclosure.

FIG. 5 is a process flow diagram 500 for controlling reticle display state based on global positioning system location in accordance with embodiments of the present disclosure. In some embodiments, the imaging device can include a global positioning system (GPS) module that can identify the location of the imaging device. The location can include GPS coordinates, country, continent, or other location information. If the imaging device is in a location that is prohibited, then the imaging device can trigger a compliance state of operation.

In some embodiments, the imaging device can activate the GPS module and determine a GPS location. (502) The GPS location can be compared against an updated jurisdiction list stored in memory. (504) If the imaging device determines that it is operating in an unauthorized jurisdiction (506), the imaging device can trigger a compliance state of operation, as described above. (508) In embodiments, if the imaging device enters into a compliance state of operation, the imaging device can send an alert to a third party with the location information of the imaging device. (510)

If the imaging device determines that it is operating in an authorized jurisdiction (506), the imaging device remains in the normal operating state. (512) The imaging device can then periodically check the location as described in 502.

In some embodiments, the GPS location determination can be performed by the imaging device periodically to ensure compliance. In some embodiments, a third party can request a location of the imaging device. The imaging device can receive a request for a GPS location. (514) In some embodiments, the imaging device can perform an authentication process to authenticate the requester. (516) For example, a public/private key can be used or other type of authentication protocol. If the requester is not authentic (518), then the imaging device can report the unauthorized request to the operator. (524)

If the requester is authentic (518), then the imaging device can use the GPS module to determine its location (502). The imaging device can send the location information to the requester using a communications protocol. (520) The imaging device can receive a compliance state signal from the authenticated requester. (522) The compliance state signal can cause the imaging device to trigger a compliance state of operation. (508) The imaging device can then send the location information to the requester or other third party. (510).

If the imaging device does not receive a compliance state signal from the authenticated requester within a certain amount of time, the imaging device maintains the normal operating state. In some embodiments, the requester can send an ACK or all clear message, which can indicate that the imaging device can maintain the normal operating mode.

In some embodiments, anytime the imaging device performs a location determination, the imaging device enters into a compliance state. This way, the imaging device cannot be used (at least not fully) during the period of time that the location of the imaging device is being determined. If the imaging device is determined to be in an authorized jurisdiction, then the imaging device can return to a normal operating state. Otherwise, the imaging device either remains in the current compliance state or enters into a more severe compliance state (e.g., a current compliance state can be that the reticle is off, while a more severer compliance state is that the imaging device shuts down entirely).

Figure 6A:
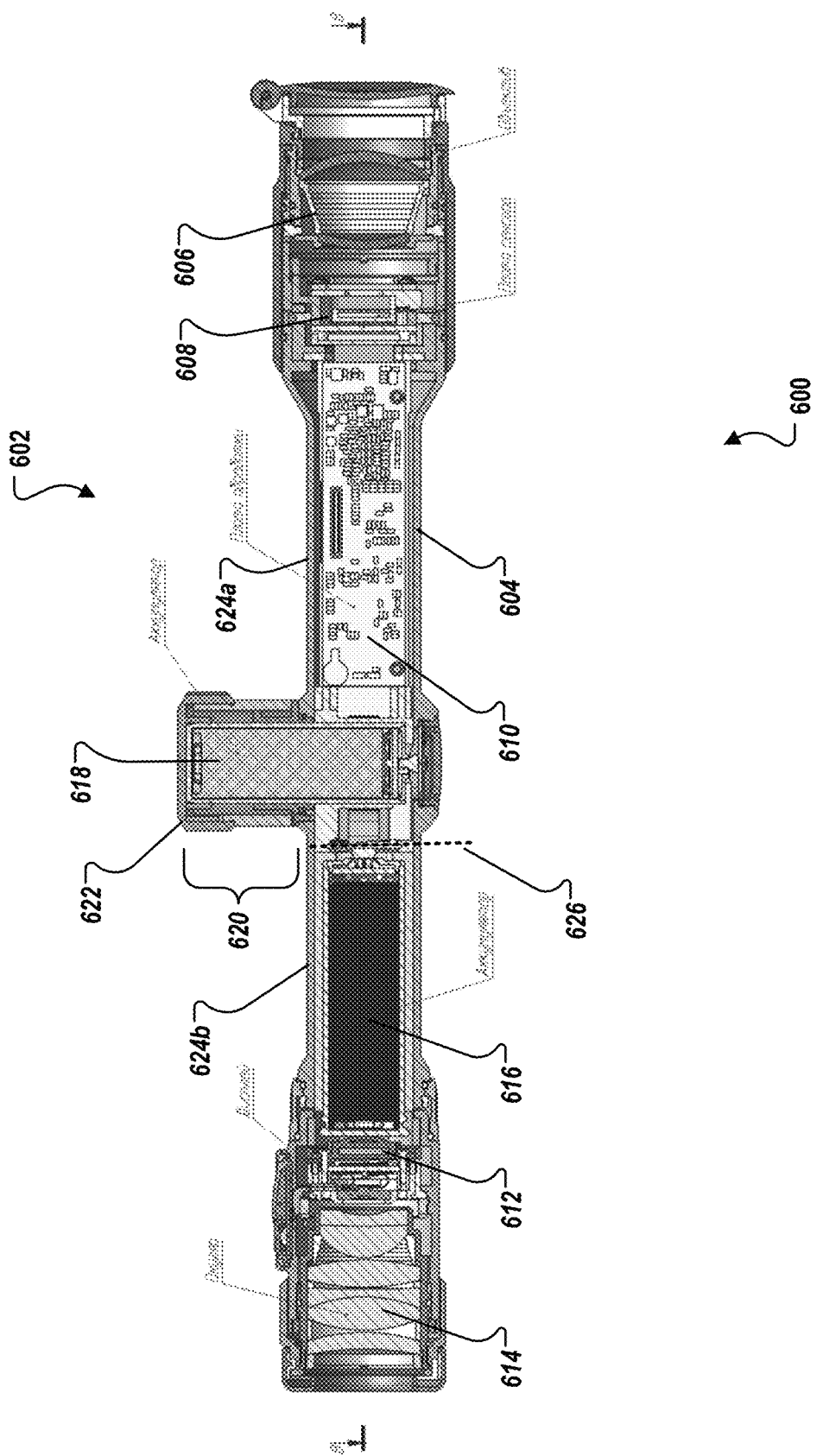
FIG. 6A is a schematic diagram illustrating a right-side, cut-away view of an example digitally-based, thermal scope configured in a conventional, optically-based scope form factor, according to an implementation of the present disclosure.
Figure 6B:
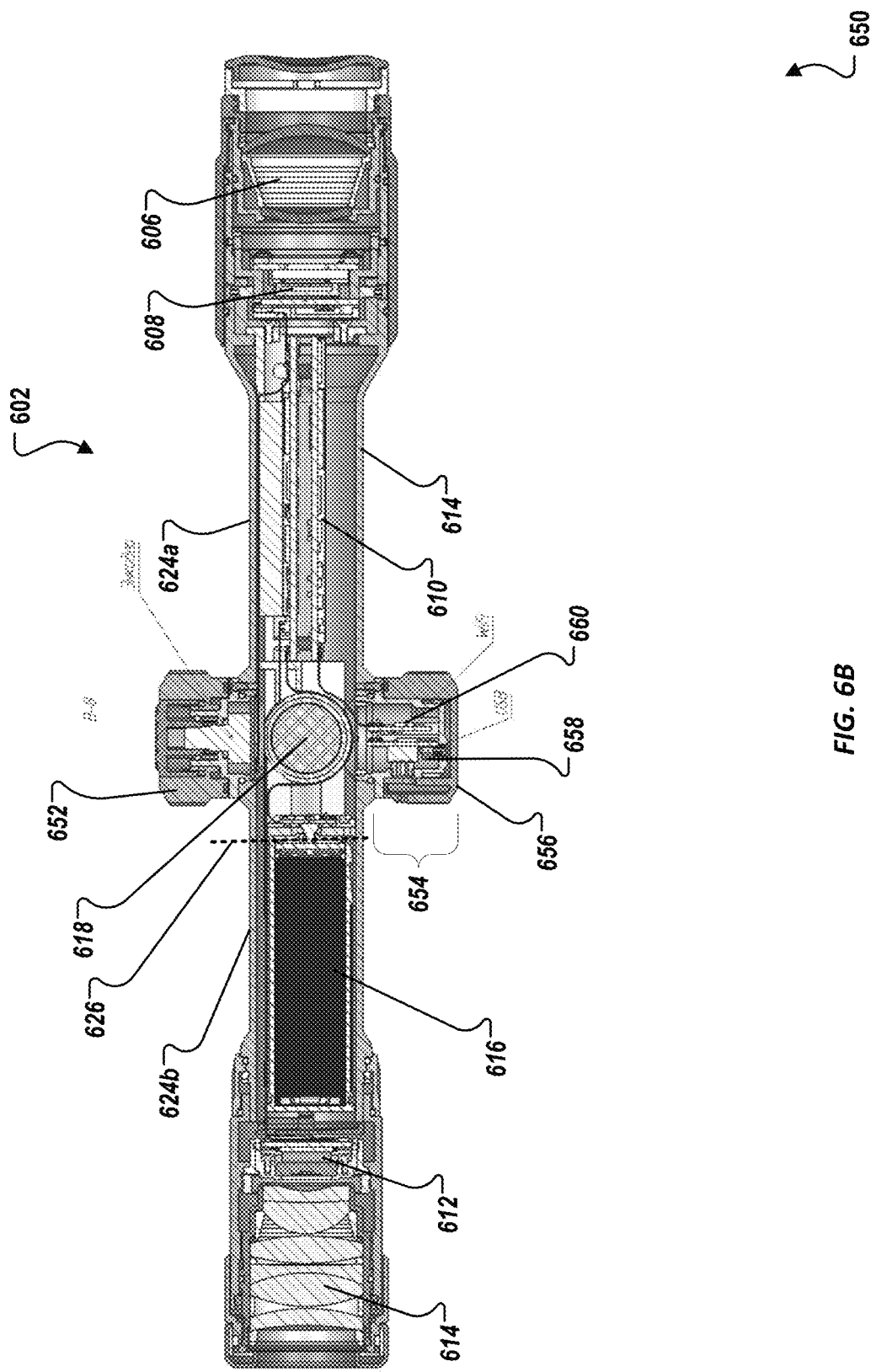
FIG. 6B is a schematic diagram illustrating a top, cut-away view of the example digitally-based, thermal scope of FIG. 6A configured in a conventional, optically-based scope form factor, according to an implementation of the present disclosure.

FIG. 6A is a schematic diagram illustrating a right-side, cut-away view 600 of an example digitally-based, thermal scope 602 according to implementations of the present disclosure. The illustrated digitally-based, thermal scope 602 in FIG. 6A includes a body 604, receiving optics 606, receiving optical sensor 608, processing electronics 610, viewing computer display 612, viewing optics 614, internal rechargeable battery 616, and user-replaceable battery 618 (within battery turret 620 and secured with a removable battery turret cap 622). Refer to FIG. 6B for two additional turret-type assemblies not displayed in FIG. 6A (that is, 652 and 654).

Body 604 is configured to permit mounting on equipment (for example, a firearm or tripod) using mounting systems similar to those used in mounting optically-based imaging devices. For example, the body 604 can be mounted to equipment at approximately positions 624a and 624b using a ring-type mounting system.

At a high-level, receiving optics 606 and receiving optical sensor 608 gather incoming electromagnetic radiation (for example, IR light) for computer processing. Data generated by the receiving optical sensor 608 (for example, a charged coupled device (CCD), complementary metal-oxide-semiconductor (CMOS), or quanta image sensor (QIS)) is processed by processing electronics 610 into image data to be recreated/represented on viewing computer display 612 (for example, a color/monochrome liquid crystal display (LCD) or organic light-emitting diode (OLED) display, or other similar/suitable display) and viewed through viewing optics 614.

Internal rechargeable battery 616 is used to provide power to components and functions associated with the illustrated digitally-based, thermal scope 602. For example, the internal rechargeable battery 616 can be used to power the receiving optical sensor 608, processing electronics 610 (and associated provided functionality), viewing computer display 612, data transfer interfaces (for example, universal serial bus (USB), FIREWIRE, and Wi-Fi), control mechanisms (for example, an integrated, rotary-type single control mechanism described in FIG. 6B), and other functions consistent with this disclosure (for example, displaying a reticle on the viewing computer display 612 and wired/wireless integration with a mobile computing device). In some implementations, the internal rechargeable battery 616 can include lead-acid, nickel-cadmium (NiCd), nickel-metal hydride (NiMH), lithium-ion (Li-ion), lithium-ion polymer (Li-ion polymer), or other suitable battery technologies consistent with this disclosure. In some implementations, the internal rechargeable battery 616 can be recharged from power supplied by a data transfer interface (for example, a USB port) or the user-replaceable battery 618. For example, processing electronics 610 can be configured to detect a low-charge state of the internal rechargeable battery 616 and pull power from the user-replaceable battery 618 to charge the internal rechargeable battery 616 to a minimum charge state (if possible).

In some implementations, the digitally-based, thermal scope 602 can be configured to use power from the user-replaceable battery 618 until reaching a minimum charge state, at which point the digitally-based, thermal scope 602 can switch to the internal rechargeable battery 616 (if of a sufficient charge state) or to be gracefully shut down due to lack of power. Once a charged user-replaceable battery 618 is re-installed, the digitally-based, thermal scope 602 can switch power consumption back to the user-replaceable battery 618. The user-replaceable battery 618 can be used to extend allowable time-of-use for the digitally-based, thermal scope 602. For example, a user can hot-swap the user-replaceable battery 618 when discharged with a fresh battery to keep the digitally-based, thermal scope 602 operating. In other implementations, the digitally-based, thermal scope 602 can be configured to use power from the internal rechargeable battery 616 until reaching a minimum charge state, at which point the digitally-based, thermal scope 602 can switch to the user-replaceable battery 618 (if present) or to be gracefully shut down due to lack of power. In some implementations, modes of battery operation (that is, primary and secondary battery usage) can be selectable by a user depending upon their particular needs.

In some implementations, an external power supply could power the digitally-based, thermal scope 602 and recharge the internal rechargeable battery 616 and user-replaceable battery 618 (if rechargeable). For example, the processing electronics 610 can be configured to determine, if external power is available (for example, using a USB port or other external port (not illustrated)) and whether the internal rechargeable battery 616 or user-replaceable battery 618 is in a low-power state. If power is available, power can be directed to recharge the internal rechargeable battery 616 or user-replaceable battery 618. In some implementations, the processing electronics 610 can trigger an indicator (for example, light-emitting diode (LED), audio chirp, viewing computer display 612, or other visual/audio indicator) that the internal rechargeable battery 616 or user-replaceable battery 618 is (or is about to be) discharged or is charging. In some implementations, the processing electronics 610 can be configured to transmit data to a mobile computing device to display a message to a user that the internal rechargeable battery 616 or user-replaceable battery 618 is discharged and needs replacement or is recharging. In some implementations, a rechargeable user-replaceable battery 618 can include lead-acid, nickel-cadmium (NiCad), nickel-metal hydride (NiMH), lithium-ion (Li-ion), lithium-ion polymer (Li-ion polymer), or other suitable battery technologies consistent with this disclosure.

In some implementations, the internal rechargeable battery 616 is not user replaceable and must be replace by an authorized service center. In other implementations, the body 604 can be configured to be separable (for example, at 626) to permit user replacement of the internal rechargeable battery 616. For example, once a rechargeable battery exceeds a certain number of recharge cycles, the battery is incapable of holding a desirable amount of charge. In this case, a user might with to replace the depleted internal rechargeable battery 616. In a particular example, the body 604 could be in two-piece configuration that is screwed together (for example, at 626) once the internal rechargeable battery 616 is installed. In this configuration, the two pieces of the body 604 can be unscrewed, separated, the internal rechargeable battery 616 replaced with a new battery, and the two pieces of the body 604 screwed back together. Other attachment mechanisms for the two pieces of the body 604 that are consistent with this disclosure are considered to be within the scope of this disclosure.

Battery turret 620 is configured to hold the user-replaceable battery 618. The removable battery turret cap 622 is used to secure the user-replaceable battery 618 within the battery turret 620. In some implementations, the user-replaceable battery 618 can be either rechargeable or non-rechargeable and varying form factors, such as a 123A, CR2032, AA, and AAA).

In some implementations, the battery turret cap 622 can be a pop-off, friction fit, or screw-type cap. In some implementations, the battery turret cap 622 can be retained to the digitally-based, thermal scope 602 using a wire loop, elastic band, or other retention mechanism to prevent the battery turret cap 622 from becoming separated from the digitally-based, thermal scope 602. In typical implementations, the battery turret cap 622 (or battery compartment 622) is configured with one or more O-rings or other seals to provide a water- and dust-proof compartment for the user-replaceable battery 618.

In some implementations, processing electronics 610 can also be configured to provide other functionality consistent with this disclosure. For example, processing electronics 610 can be configured to provide Wi-Fi, USB, streaming video, firmware upgrades, connectivity with mobile computing devices, control interfaces, and other functionality consistent with this disclosure associated with the digitally-based, thermal scope 602.

FIG. 6B is a schematic diagram illustrating a top, cut-away view 650 of the example digitally-based, thermal scope 602 of FIG. 6A configured in a conventional, optically-based scope form factor, according to an implementation of the present disclosure. As illustrated in FIG. 6B, the digitally-based, thermal scope 602 includes an integrated, push/rotary-type single control mechanism turret (control) 652 and data transfer interface turret 654. Other form factors are within the scope of this disclosure.

Control 652 can provide integrated control functionality associated with the digitally-based, thermal scope 602. For example, if the digitally-based, thermal scope 602 is powered off, a long push in of a "cap" configured into the control 652 can power on the digitally-based, thermal scope 602 (or conversely power off the digitally-based, thermal scope 602 if powered on). While looking through viewing optics 614 at the viewing computer display 612, rotary- and push-type actions of the control 652 can be used to navigate among displayed graphical user interface menus and select menu items. Any function provided by control 652 that is consistent with this disclosure is considered to be within the scope of this disclosure. In some implementations, a mobile computing device can be integrated with the digitally-based, thermal scope 602 (for example, using Wi-Fi) and provide an interface (for example, with a software application) to permit alternative configuration of the digitally-based, thermal scope 602.

Data transfer interface turret 654 is used to provide data transfer interfaces (for example, USB 658 and Wi-Fi 660) for the digitally-based, thermal scope 602. For example, in conjunction with the processing electronics 610, the described data transfer interface can provide Wi-Fi, USB, streaming video, firmware upgrades, connectivity with mobile computing devices, control interfaces, and other functionality consistent with this disclosure and associated with the digitally-based, thermal scope 602. In some implementations, the data transfer interfaces (for example, USB 658) can be used to provide external power to the digitally-based, thermal scope 602 to power digitally-based, thermal scope 602 functionality or to recharge the internal rechargeable battery 616 or user-replaceable battery 618.

In some implementations, data transfer interface turret 654 is configured with a removable turret cap 656. In some implementations, the turret cap 656 can be a pop-off, friction-fit, or screw-type cap. In some implementations, the turret cap 656 can be retained to the digitally-based, thermal scope 602 using a wire loop, elastic band, or other retention mechanism to prevent the turret cap 656 from becoming separated from the digitally-based, thermal scope 602. In typical implementations, the turret cap 656 (or data transfer interface turret 654) is configured with one or more O-rings or other seals to provide a water- and dust-proof compartment for the associated data transfer interfaces.

Note, while this disclosure has described configurations and functionality associated with a digitally-based imaging device sensitive to thermal electromagnetic radiation (for example, IR), as will be appreciated by those of ordinary skill in the art, the described subject matter is also applicable to implementations of digitally-based imaging devices sensitive to any other type of detectable electromagnetic radiation (for example, ultraviolet (UV) and visible/ambient/daylight). These other implementations are considered to be within the scope of this disclosure.

Figure 7:
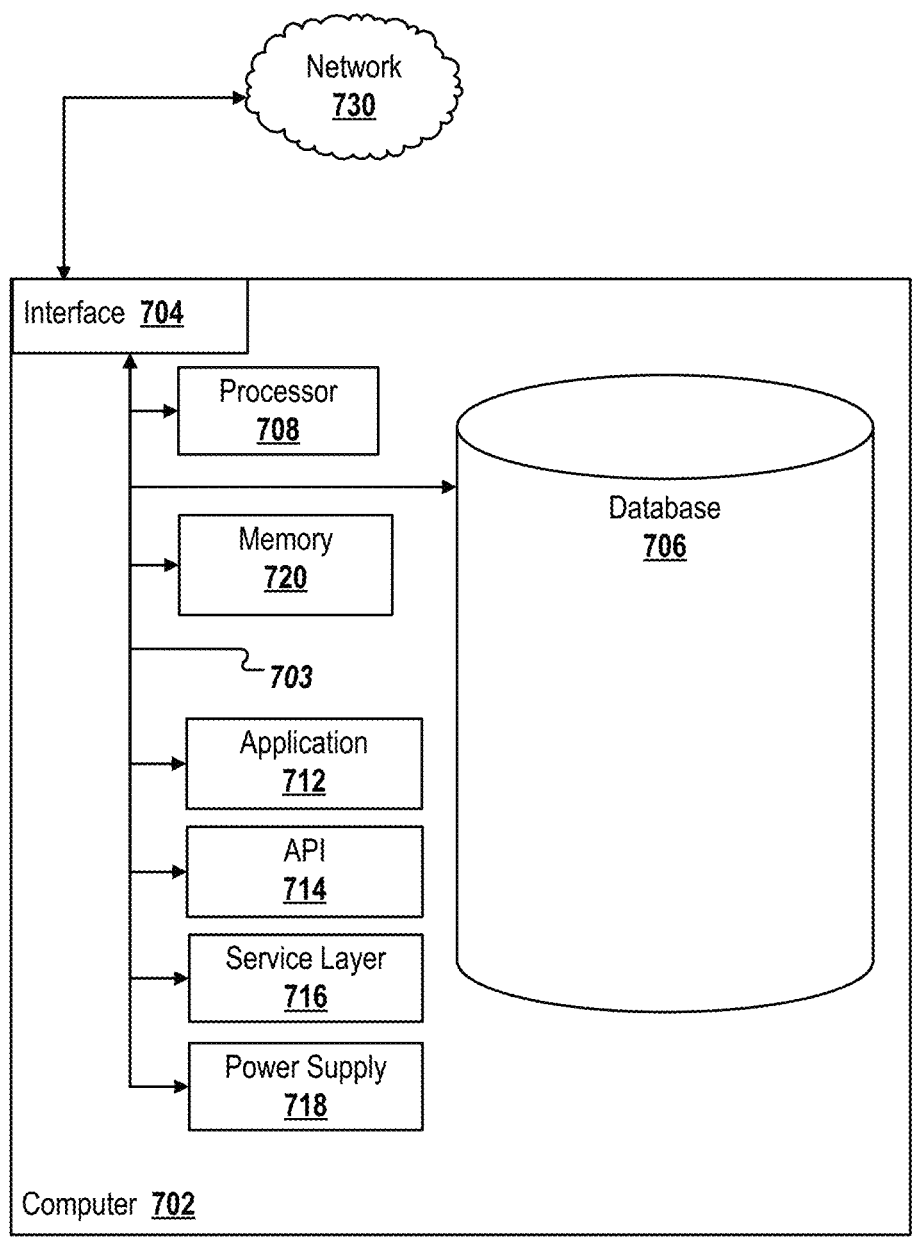
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 (for example, representing or as part of processing electronics 106) used to provide computational functionalities associated with described algorithms, methods, functions, processes, flows, and procedures, according to an implementation of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the computer 702 can include an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a distributed computing system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 714, a service layer 716, or a combination of the API 714 and service layer 716. The API 714 can include specifications for routines, data structures, and object classes. The API 714 can be either computer-language independent or dependent and refer to a complete interface, a single function, or even a set of APIs. The service layer 716 provides software services to the computer 702 or other components (whether illustrated or not) that are communicably coupled to the computer 702. The functionality of the computer 702 can be accessible for all service consumers using the service layer 716. Software services, such as those provided by the service layer 716, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 714 or the service layer 716 as stand-alone components in relation to other components of the computer 702 or other components (whether illustrated or not) that are communicably coupled to the computer 702. Moreover, any or all parts of the API 714 or the service layer 716 can be implemented as a child or a sub-module of another software module, enterprise application, or hardware module without departing from the scope of the present disclosure.

The computer 702 includes an interface 704. Although illustrated as a single interface 704, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or hardware of interface 704 is operable to communicate physical signals within and outside of the illustrated computer 702. In an example, interface 704 can include USB, FIREWIRE, or Wi-Fi technologies.

The computer 702 includes a processor 708. Although illustrated as a single processor 708, two or more processors 708 can be used according to particular needs, desires, or particular implementations of the computer 702. Generally, the processor 708 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 720 that can hold data for the computer 702, another component or components communicatively linked to the network 730 (whether illustrated or not), or a combination of the computer 702 and another component. memory 720 can store any data consistent with the present disclosure. In some implementations, memory 720 can be a combination of two or more different types of memory (for example, a combination of semiconductor and magnetic storage) according to particular needs, desires, or particular implementations of the computer 702 and the described functionality. Although illustrated as a single memory 720, two or more memories 720 or similar or differing types can be used according to particular needs, desires, or particular implementations of the computer 702 and the described functionality. While memory 720 is illustrated as an integral component of the computer 702, in alternative implementations, memory 720 can be external to the computer 702.

The application 712 is an algorithmic software engine providing functionality according to particular needs, desires, or particular implementations of the computer 702, particularly with respect to functionality described in the present disclosure. For example, application 712 can serve as one or more components, modules, or applications. Further, although illustrated as a single application 712, the application 712 can be implemented as multiple applications 708 on the computer 702. In addition, although illustrated as integral to the computer 702, in alternative implementations, the application 712 can be external to the computer 702.

The computer 702 can also include a power supply 718. The power supply 718 can include a rechargeable or non-rechargeable battery that can be configured to be either user- or non-user-replaceable. In some implementations, the power supply 718 can include power-conversion or management circuits (including recharging, standby, or another power management functionality). In some implementations, the power supply 718 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

Example 1 is an imaging device including an image capture device configured to view an image of a scene that includes an object viewed by the imaging device; a display to display an image of a reticle and the image of the scene; a hardware processor; and a memory storing computer-readable instructions, the instructions executable by the hardware processor to perform operations including performing image recognition analysis on the image of the scene; determining that the object in the image is a prohibited object; and causing the display to cease displaying the image of the reticle.

Example 2 may include the subject matter of example 1, further including a memory including an object list; wherein determining that the object in the image is a prohibited object includes comparing the object to the object list.

Example 3 may include the subject matter of any of examples 1-2, the operations including determining that the prohibited object is in a field of view of the imaging device; and causing the imaging device to turn off if the prohibited object is in the field of view after an expiration of a threshold amount of time.

Example 4 may include the subject matter of any of examples 1-3, the operations including incrementing a counter indicating a counter value of times a prohibited object has been identified; comparing the counter value to a threshold value; and turning the imaging device off if the counter value exceeds the threshold.

Example 5 may include the subject matter of any of examples 1-4, the operations including determining that the prohibited object is in a field of view of the imaging device; and causing the display to turn off if the prohibited object is in the field of view after an expiration of a threshold amount of timer.

Example 6 may include the subject matter of any of examples 1-5 the operations including performing image recognition analysis on an image of a scene; determining that the object is no longer in the image; and causing the reticle to be displayed on the display.

Example 7 may include the subject matter of any of examples 1-6, wherein the image capture device includes a camera.

Example 8 may include the subject matter of any of examples 1-7, wherein the imaging device includes at least one of a thermal imaging device and a night-vision device.

Example 9 is a method including displaying a reticle on a display of an imaging device; viewing, by the imaging device, an object within a field of view of the imaging device; determining, by an image processor, that the object is a prohibited object; and ceasing to display the reticle on the display of the imaging device.

Example 10 may include the subject matter of example 9, further including determining that the prohibited object is in a field of view of the imaging device; and causing the imaging device to turn off if the prohibited object is in the field of view after an expiration of a threshold amount of time.

Example 11 may include the subject matter of any of examples 9-10, further including incrementing a counter indicating a counter value of times a prohibited object has been identified; comparing the counter value to a threshold value; and turning the imaging device off if the counter value exceeds the threshold.

Example 12 may include the subject matter of any of examples 9-11, further including determining that the prohibited object is in a field of view of the imaging device; and causing the display to turn off if the prohibited object is in the field of view after an expiration of a threshold amount of timer.

Example 13 may include the subject matter of any of examples 9-12, further including performing image recognition analysis on an image of a scene; determining that the object is no longer in the image; and causing the reticle projector to display of the image of the reticle.

Example 14 is a non-transitory, computer-readable medium storing instructions, the instructions executable by a hardware processor to perform operations including display a reticle on a display of an imaging device; receive signals representing an object in a scene; create an imaging of the object in the scene from the received signals; performing image recognition analysis on the image of objects in a scene; determining that the object in the image is a prohibited object; and causing the display to cease displaying the image of the reticle.

Example 15 may include the subject matter of example claim 14, the operations further including determining that the prohibited object is in a field of view of the imaging device; and causing the imaging device to turn off if the prohibited object is in the field of view after an expiration of a threshold amount of time.

Example 16 may include the subject matter of any of examples 14-15, the operations further including incrementing a counter indicating a counter value of times a prohibited object has been identified; comparing the counter value to a threshold value; and turning the imaging device off if the counter value exceeds the threshold.

Example 17 may include the subject matter of any of examples 14-16, the operations further including determining that the prohibited object is in a field of view of the imaging device; and causing the display to turn off if the prohibited object is in the field of view after an expiration of a threshold amount of timer.

Example 18 may include the subject matter of any of examples 14-17, the operations further including performing image recognition analysis on an image of a scene; determining that the object is no longer in the image; and causing the display to display the reticle.

What is claimed is:

1. An imaging device comprising:
    an image capture device configured to view an image of a scene that includes an object viewed by the imaging device;
    a display to display an image of a reticle and the image of the scene;
    a hardware processor;
    a positioning system; and
    a memory storing computer-readable instructions, the instructions executable by the hardware processor to perform operations comprising:
        determining a location of the imaging device using the positioning system;
        capturing an image of the scene;
        performing image recognition of the image of the scene;
        identifying a target object in the scene based on image recognition;
        determining that the target object is a prohibited object based on the determined location of the imaging device; and
        causing the display to enter into a compliance state of operation that is in compliance with one or more laws of the location
        wherein the compliance state allows a user to continue using the device in a manner compliant with one or more laws of the location.

2. The imaging device of claim 1, wherein the compliance state comprises ceasing displaying the image of the reticle based on the determination that the imaging device is operating in a manner not compliant with one or more laws of the location.

3. The imaging device of claim 1, wherein the compliance state comprises ceasing operation of the imaging device.

4. The imaging device of claim 1, wherein the memory comprises a prohibited locations list, and
    wherein determining that the imaging device is being operated in a manner not compliant with one or more laws of the location comprises determining that the imaging device is being operated in a country on the prohibited locations list stored in memory.

5. The imaging device of claim 1, wherein one or more laws of a location include trade sanctions or laws about using an imaging device.

6. The imaging device of claim 1, the operations further comprising:
    imaging an object using the imaging device;
    performing image recognition on the object;
    determining that imaging the object is out of compliance for the determined location; and
    causing the imaging device to enter into the compliance state based on determining that imaging the object is out of compliance for the determined location.

7. The imaging device of claim 6, the operations comprising:
  determining that the object is in a field of view of the imaging device; and
  causing the imaging device to turn off if the object is in the field of view after an expiration of a threshold amount of time.

8. The imaging device of claim 6, the operations comprising:
  incrementing a counter indicating a counter value of times a object has been identified;
  comparing the counter value to a threshold value; and
  turning the imaging device off if the counter value exceeds the threshold.

9. The imaging device of claim 1, the operations comprising:
  performing image recognition analysis on an image of a scene;
  determining that the imaging device is being operated in a compliant state; and
  causing the reticle to be displayed on the display.

10. The imaging device of claim 1, wherein the imaging device comprises at least one of a thermal imaging device and a night-vision device.

11. A method performed by an imaging device, the method comprising:
  determining a location of the imaging device using the positioning system;
  capturing an image of a scene;
  performing image recognition of the image of the scene;
  identifying a target object in the scene based on image recognition;
  determining that the target object is a prohibited object based on the determined location of the imaging device; and
  causing the display to enter into a compliance state of operation that is in compliance with one or more laws of the location,
  wherein the compliance state allows a user to continue using the device in a manner compliant with one or more laws of the location.

12. The method of claim 11, wherein the compliance state comprises ceasing displaying the image of the reticle based on the determination that the imaging device is operating in a manner not compliant with one or more laws of the location.

13. The method of claim 11, wherein the compliance state comprises ceasing operation of the imaging device.

14. The method of claim 11, wherein determining that the imaging device is being operated in a manner not compliant with one or more laws of the location comprises determining that the imaging device is being operated in a country on the prohibited locations list stored in a memory of the imaging device.

15. The method of claim 11, wherein a the one or more laws of a location include trade sanctions or laws about using an imaging device.

16. The method of claim 11, the operations further comprising:
  imaging an object using the imaging device;
  performing image recognition on the object;
  determining that imaging the object is out of compliance for the determined location; and
  causing the imaging device to enter into the compliance state based on determining that imaging the object is out of compliance for the determined location.

17. The method of claim 16, the operations comprising:
  determining that the object is in a field of view of the imaging device; and
  causing the imaging device to turn off if the object is in the field of view after an expiration of a threshold amount of time.

18. The method of claim 16, the operations comprising:
  incrementing a counter indicating a counter value of times a object has been identified;
  comparing the counter value to a threshold value; and
  turning the imaging device off if the counter value exceeds the threshold.

19. The method of claim 11, the method comprising
  performing image recognition analysis on an image of a scene;
  determining that the imaging device is being operated in a compliant state; and
  causing the reticle to be displayed on the display.

20. The method of claim 11, wherein the imaging device comprises at least one of a thermal imaging device and a night-vision device.

21. A non-transitory, computer-readable medium storing instructions, the instructions executable by a hardware processor to perform operations comprising:
  determining a location of the imaging device using the positioning system;
  capturing an image of a scene;
  performing image recognition of the image of the scene;
  identifying a target object in the scene based on image recognition;
  determining that the target object is a prohibited object based on the determined location of the imaging device; and
  causing the display to enter into a compliance state of operation that is in compliance with one or more laws of the location,
  wherein the compliance state allows a user to continue using the device in a manner compliant with one or more laws of the location.

22. The non-transitory, computer-readable medium storing instructions of claim 21, wherein the compliance state comprises ceasing displaying the image of the reticle based on the determination that the imaging device is operating in a manner not compliant with one or more laws of the location.

* * * * *